US008467618B2

United States Patent
Ueda et al.

(10) Patent No.: US 8,467,618 B2
(45) Date of Patent: Jun. 18, 2013

(54) DATA PROCESSING DEVICE, IMAGE ENCODING/DECODING DEVICE AND DATA PROCESSING SYSTEM

(75) Inventors: Hiroshi Ueda, Tokyo (JP); Kenichi Iwata, Tokyo (JP); Seiji Mochizuki, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/469,182

(22) Filed: May 11, 2012

(65) Prior Publication Data

US 2012/0275771 A1    Nov. 1, 2012

Related U.S. Application Data

(63) Continuation of application No. 12/399,956, filed on Mar. 8, 2009, now Pat. No. 8,189,935.

(30) Foreign Application Priority Data

Mar. 27, 2008 (JP) ................................ 2008-083112

(51) Int. Cl.
  *H04N 7/50* (2006.01)
(52) U.S. Cl.
  USPC ........................... 382/232; 382/233; 382/239
(58) Field of Classification Search
  USPC ........... 382/232, 233, 239; 713/190; 711/118, 711/125; 718/101; 712/25, 201; 715/700; 707/999.103; 386/334, 330; 326/E5.001
  See application file for complete search history.

(56) References Cited

U.S. PATENT DOCUMENTS

| 7,178,069 | B2 | 2/2007 | Hashimoto et al. |
| 7,286,717 | B2 | 10/2007 | Nomizu |
| 7,401,163 | B2 | 7/2008 | Nishimoto et al. |
| 7,568,112 | B2 * | 7/2009 | Yamaguchi et al. .......... 713/190 |
| 7,773,817 | B2 | 8/2010 | Wakasa |
| 2005/0273526 | A1 | 12/2005 | Nishimoto et al. |
| 2008/0044090 | A1 | 2/2008 | Wakasa |

FOREIGN PATENT DOCUMENTS

| CN | 1488103 A | 4/2004 |
| JP | 2005-056033 A | 3/2005 |
| JP | 2005-122759 | 5/2005 |
| JP | 2006-178689 A | 7/2006 |
| JP | 2008-48130 | 2/2008 |

OTHER PUBLICATIONS

Office Action issued Apr. 6, 2012,in Chinese patent Application 200910128668.3.

(Continued)

*Primary Examiner* — Anh Do
(74) *Attorney, Agent, or Firm* — Miles & Stockbridge P.C.

(57) ABSTRACT

An image encoding/decoding device includes a first circuit and a second circuit for providing initial setting to image processing modules. The image encoding/decoding device does not receive information, which is initially set to the image processing modules, directly from an external CPU, and control information for the initial setting is set to the first circuit from the CPU. The second circuit reads in initial setting information and setting-target information of the initial setting information from outside using the control information set in the first circuit and transfers the initial setting information to an image processing module according to the setting-target information. The CPU does not need to set the whole information, which is initially set to the image processing modules, directly to the image encoding/decoding device, and also does not need to set both a transfer source address and a transfer destination address as in DMA transfer.

8 Claims, 12 Drawing Sheets

OTHER PUBLICATIONS

Office Action issued Jun. 28, 2012 in Japanese Patent Application No. 2008-083112.

Office Action issued Sep. 25, 2012 in Chinese Patent Application No. 200910128668.3.

* cited by examiner

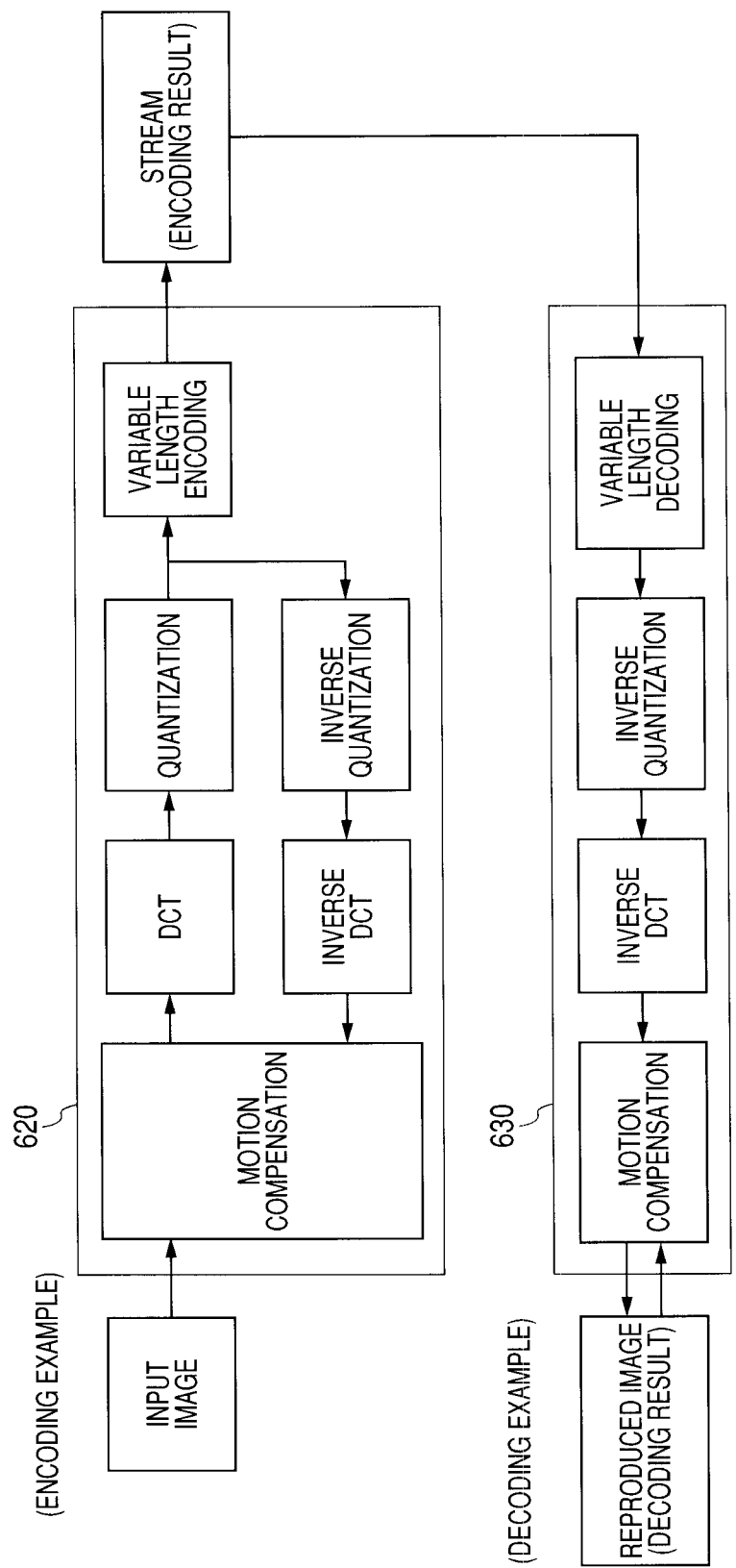

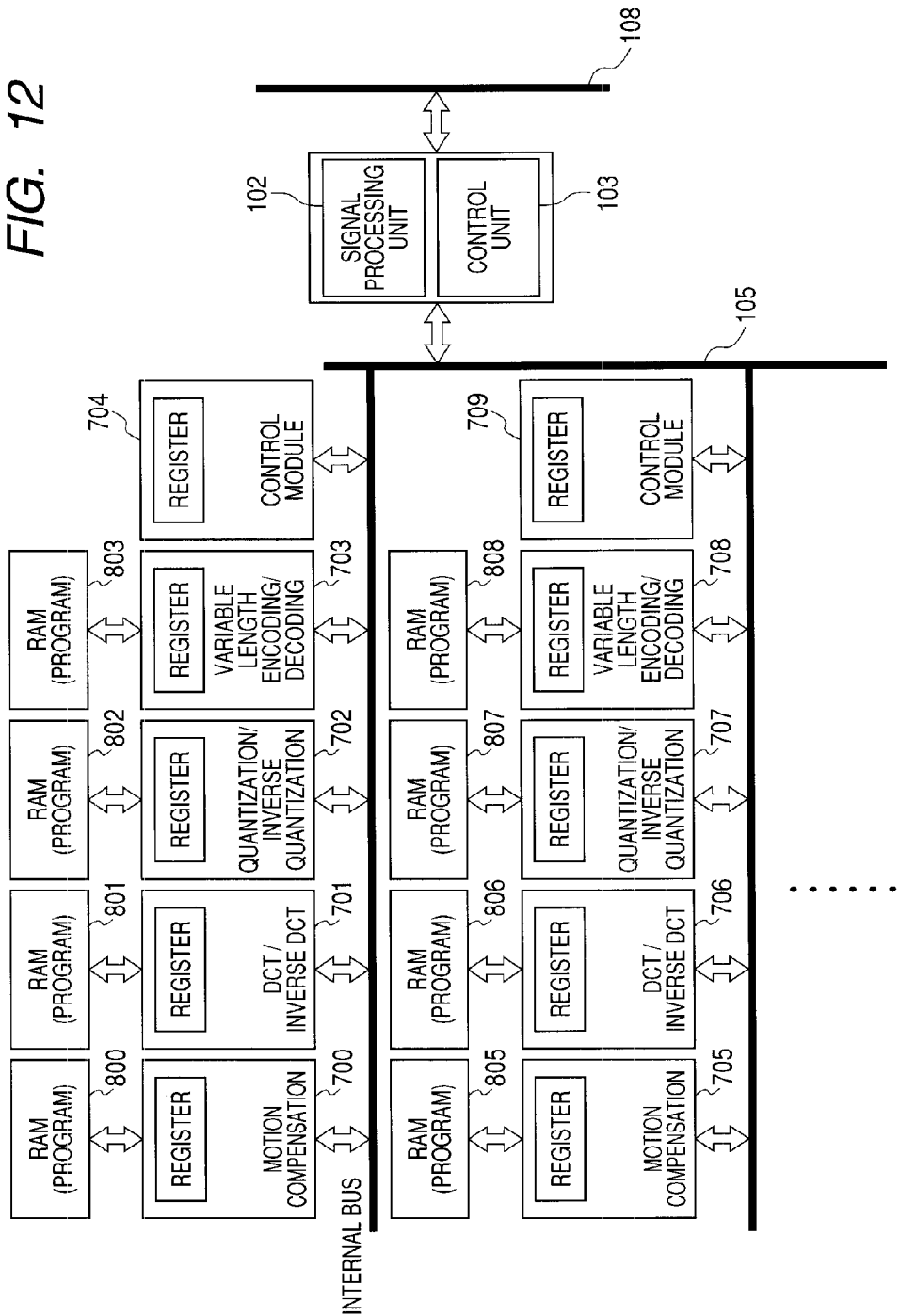

DATA PROCESSING DEVICE, IMAGE ENCODING/DECODING DEVICE AND DATA PROCESSING SYSTEM

CROSS-REFERENCE TO RELATED APPLICATION

This application is a continuation of application Ser. No. 12/399,956 filed Mar. 8, 2009 now U.S. Pat. No. 8,189,935. Also, the present application claims priority from Japanese patent application No. 2008-83112 filed on Mar. 27, 2008, the content of which is hereby incorporated by reference into this application.

BACKGROUND OF THE INVENTION

The present invention relates to a data processing device, an image encoding/decoding device, and a data processing system applying the same, and relates to a technique effective when applied to any of video-image reproducing and recording apparatuses such as a DVD/HDD recorder which is image compression and decompression hardware, a digital video camera, a digital camera, a mobile phone, a navigation system, and a digital television, for example.

Recently, an image encoding/decoding device has been provided with a more complicated function for supporting, for example, multi-codec processing which can support multiple kinds of image encoding/decoding algorithms such as MPEG2 and MPEG4, and has been increasing the number of registers performing initial setting, increasing a capacity of a program file, etc. In the prior art, a CPU sets each of a large number of registers within the image encoding/decoding device one by one utilizing a slave access of a bus, and therefore the initial setting operation takes a long time. Further, there arises also a problem that a data amount to be set becomes enormous and a load of the CPU increases as the number of registers increases.

Patent document 1 (Japanese Unexamined Patent Application Publication No. 2005-56033) discloses a technique to cover the setting time by providing two registers, and by using one register for current operation and the other register for setting the next operation or retaining an initial value of the register. Patent document 2 (Japanese Unexamined Patent Application Publication No. 2006-178689) discloses a technique to reduce the setting data amount and time by transferring compressed data and setting the data to the register after decompression thereof within the circuit.

SUMMARY OF THE INVENTION

In performing the image encoding or decoding, however, there are use cases such as one switching the encoding and decoding processing for each frame, and one switching a type of codec (type of algorithm) for each frame. These cases require a specific condition that a register setting or a program file has to be changed for each frame. Considering this condition, the techniques disclosed in above Patent documents 1 and 2 cannot sufficiently handle such cases. Further, while it is possible to reduce the load of the CPU securely by employing DMA transfer, the present inventors have discovered that there is also a limit in the CPU load reduction by the simple DMA transfer when the data is initially set frequently and in a large amount. The above situation is the same for a data processing device having multiple processor units which perform data processing in parallel according to the initially set program and data.

An object of the present invention is to reduce the processing load of an external CPU, when data is initially set frequently and in a large amount to a data processing device represented by the image encoding/decoding device.

The above and other objects and novel features of the present invention will become apparent from the description of the present specification and the accompanying drawings.

The following is a simple outline description of a representative invention among the inventions disclosed in the present application.

That is, an image encoding/decoding device (data processing device) includes a first circuit and a second circuit for providing initial setting to a plurality of image processing modules (processor units), wherein the image encoding/decoding device does not receive information, which is initially set to the image processing modules, directly from the external CPU, and control information for the initial setting is set to the first circuit from the CPU. The second circuit reads in initial setting information and setting-target information of the initial setting information from outside using the control information set in the first circuit and transfers the initial setting information to the image processing module according to the read-in setting-target information.

Thereby, the CPU does not need to set the whole information, which is initially set to the image processing modules, directly to the image encoding/decoding device, and also does not need to set both of a transfer source address and a transfer destination address which are required as in a case of utilizing DMA transfer. Further, when the CPU uses the DMA transfer, a storage circuit to be provided with the initial setting requires being mapped into an address space of the CPU and occupies a large part of the address space of the CPU, but the above method does not need the mapping in the address space of the CPU and the storage circuit to be provided with the initial setting in each of the image processing modules may be mapped into an local address.

The following is a simple description of the advantage obtained by a representative invention among the inventions disclosed in the present application.

That is, it is possible to reduce a processing load of an external CPU, even when data is initially set frequently and in a large amount to an image encoding/decoding device.

BRIEF DESCRIPTION OF THE DRAWINGS

FIG. 11 is a basic functional-block-diagram of an encoding element and a decoding element for a video image in the image encoding/decoding device.

FIG. 12 is a block diagram of multiple image processing modules suitable for a case in which the functions of the encoding element and the decoding element in FIG. 11 are performed by a pipeline method.

DETAILED DESCRIPTION OF THE PREFERRED EMBODIMENTS

1. Outline of the Embodiment

Figure 1:
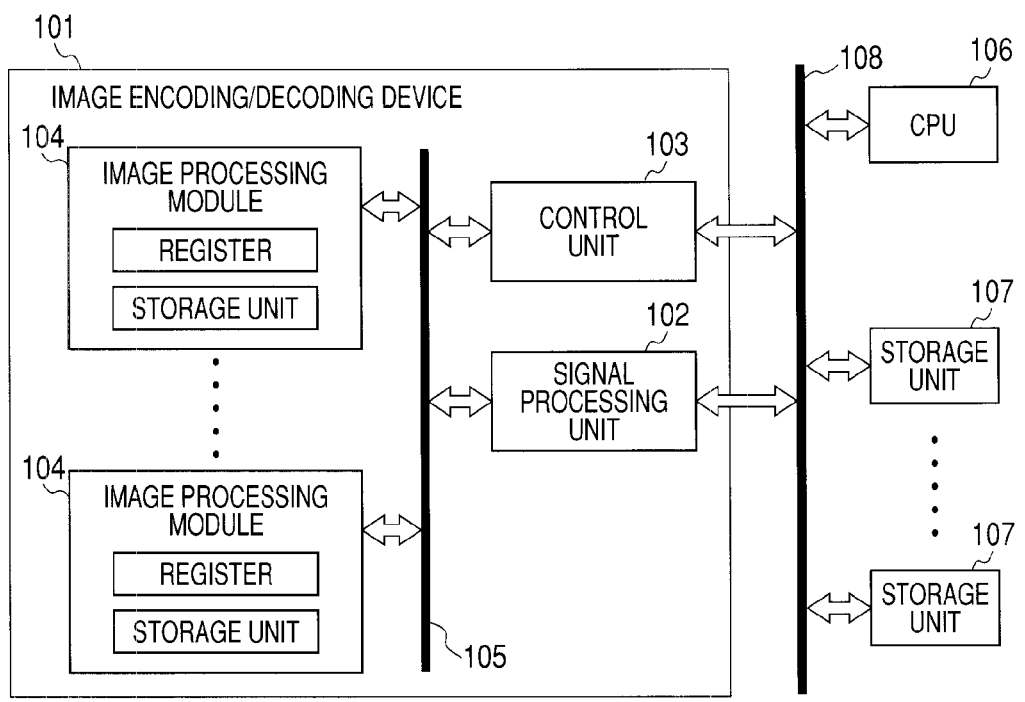
FIG. 1 is a block diagram showing an example of an image encoding/decoding device according to the present invention.

First, there will be described an outline of a representative embodiment of the invention disclosed in the present application. In the outline description of the representative embodiment, a reference symbol in the drawing, which is referred to in parentheses, only illustrates an object included in the concept of the constituent provided with the reference symbol.

[1] A data processing device according to the present invention includes a plurality of processor units performing data processing in parallel according to an initially set program and data; a first circuit, to which control information is set from outside for initial setting, and a second circuit reading-in initial setting information and setting-target information of the initial setting information from outside using the control information set in the first circuit, and transferring the initial setting information to the processor unit according to the read-in setting-target information.

[2] An image encoding/decoding device according to the present invention includes a plurality of image processing modules enabled to perform encoding and decoding processing of image data according to initially set contents; a first circuit, to which control information is set from outside for initial setting; and a second circuit reading-in initial setting information and setting-target information of the initial setting information from outside using the control information set in the first circuit, and transferring the initial setting information to the image processing module according to the read-in setting-target information.

[3] In the image encoding/decoding device according to paragraph [2], the control information includes address information indicating storage locations of the initial setting information and the setting-target information, for example.

[4] In the image encoding/decoding device according to paragraph [3], the control information includes address information indicating heads of the storage locations of the initial setting information and the setting-target information, for example, and the second circuit increments the address information indicating the heads sequentially and generates read-in targets of the initial setting information and the setting-target information.

[5] In the image encoding/decoding device according to paragraph [2], the setting-target information is information indicating which image processing module and information indicating an address of a storage area within the image processing module, for example.

[6] In the image encoding/decoding device according to paragraph [4], the initial setting information and the setting-target information constitute a fixed-length packet for each set of the setting-target information, each packet including a flag, and a first state of the flag indicating that the flag is followed by the initial setting information and a second state of the flag indicating that the packet is an end packet.

[7] In the image encoding/decoding device according to paragraph [6], for example, the second circuit completes the read-in of the initial setting information and the setting-target information, and completes the transfer processing of the initial setting information according to the read-in information, in response to the flag of the end packet.

[8] In the image encoding/decoding device according to paragraph [6], for example, the second circuit transfers code information to the first circuit according to the address information following the flag of the end packet, and the first circuit instructs the image processing modules to start the image encoding and decoding processing in response to the transferred code information.

[9] The image encoding/decoding device according to paragraph [2] includes a plurality of processor units performing a plurality of sets of arithmetic processing for the encoding processing in parallel as the image processing modules; and a plurality of processor units performing a plurality of sets of arithmetic processing for the decoding processing in parallel as the image processing modules.

[10] In the image encoding/decoding device according to paragraph [9], a RAM, which is utilized for storing an operation program of the processor units and data, is provided to each data processor and the initial setting information is initially set to the RAM.

[11] A data processing system according to the present invention includes an image encoding/decoding device of paragraph [7], a CPU setting control information to the first circuit of the image encoding/decoding device, and a storage unit storing the initial setting information and the setting-target information to be read-in by a second circuit of the image encoding/decoding device.

[12] In the data processing system according to paragraph [11], the CPU sets the control information, which is necessary for selecting one from among a plurality of different encoding/decoding processing algorithms, to the first circuit of the image encoding/decoding device.

[13] The data processing system according to paragraph {11} is mounted on a mobile phone, for example.

2. Details of the Embodiment

The embodiment will be described in more detail. Hereinafter, the embodiment for implementing the present invention will be described in detail according to the drawings. Note that, in all the drawings to explain the embodiment for implementing the invention, elements having the same function are designated by the same symbol and repeated description thereof will be omitted.

FIG. 1 shows an example of an image encoding/decoding device according to the present invention. An image encoding/decoding device 101 is positioned as an accelerator or a peripheral circuit module provided in a data processing system including a CPU (Central Processing Unit) 106 and a storage unit 107 which are coupled in common to a bus 108. The bus 108 is, while not limited in particular, composed of a split transaction bus and a router, and performs bus control by a data transfer protocol, in which a request packet from an initiator is transferred to a target and the target returns a response packet to the initiator of a transfer source as needed. Here, the CPU 106 or a control unit 103 can be the initiator, that is, a bus master.

The image encoding/decoding device 101 includes multiple image processing modules 104, the control unit 103, and a signal processing unit 102, which are coupled in common to an internal bus 105. The signal processing unit 102 performs initial setting of data and a program to a register and a storage unit of the image processing module 104. The control unit 103 controls the entire image encoding/decoding device according to an instruction from the CPU 106: for example, receives information, which is necessary for the initial setting performed by the signal processing unit 102, from the CPU 106 to enable the initial setting operation of the signal processing unit 102, and also performs activation control or the like of the image processing module 104 which has completed the initial setting.

The storage unit 107 is utilized for storing initial setting value data, image data, encoded data, etc. The multiple image processing modules 104 are composed of, for example, multiple circuit modules respectively performing orthogonal transformation processing (DCT) and processing of quantization, variable length encoding, etc. for encoding image data, and multiple circuit modules respectively performing processing of variable length decoding, inverse quantization, inverse DCT, etc. for decoding the encoded data. Further, these image processing modules are enabled to be able to select the processing compliant to a standard such as MPEG2, MPEG4, and H.264, according to the program and the control data which are initially-set thereto. Accordingly, the image processing modules selectively support each of processing for a digital still camera, processing for a video camera, and image processing for a TV phone. For example, when a mobile phone application or the like is assumed, it is presumed that a comparatively large amount of setting data is initially set frequently to the multiple image processing modules 104. In the image encoding/decoding device 101, the efficient initial setting is taken into consideration for the image processing modules 104. This point will be described in the following.

Figure 2:
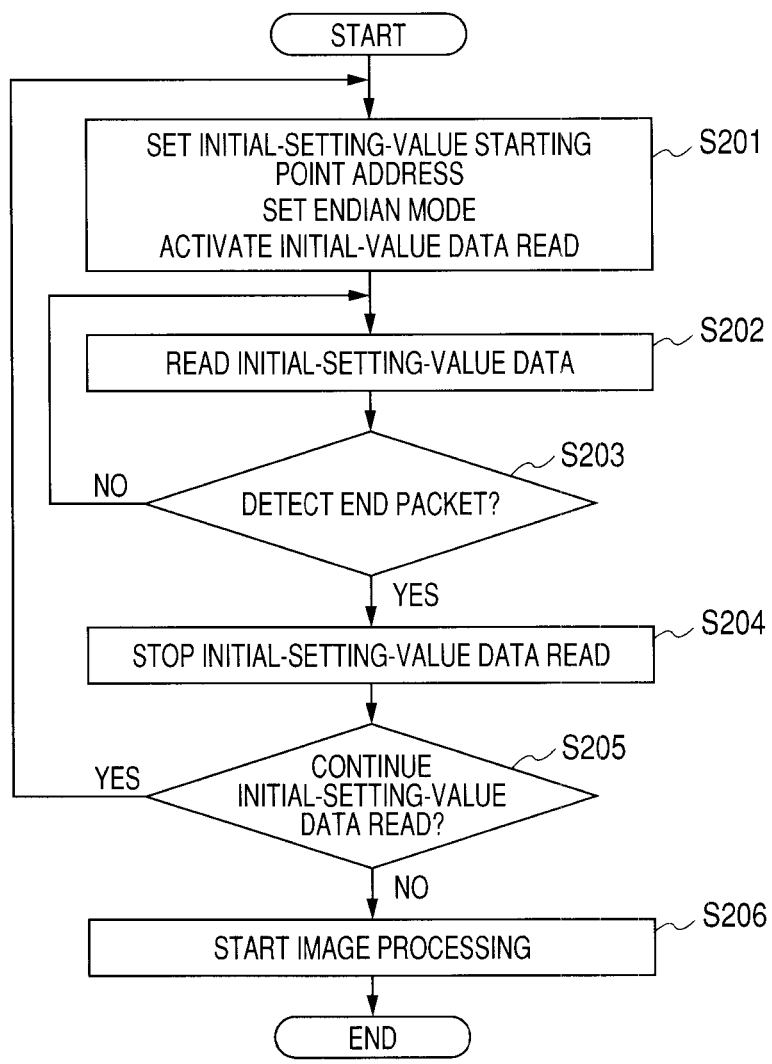
FIG. 2 is a flowchart showing activation processing in image encoding or decoding processing using the image encoding/decoding device.
Figure 3:
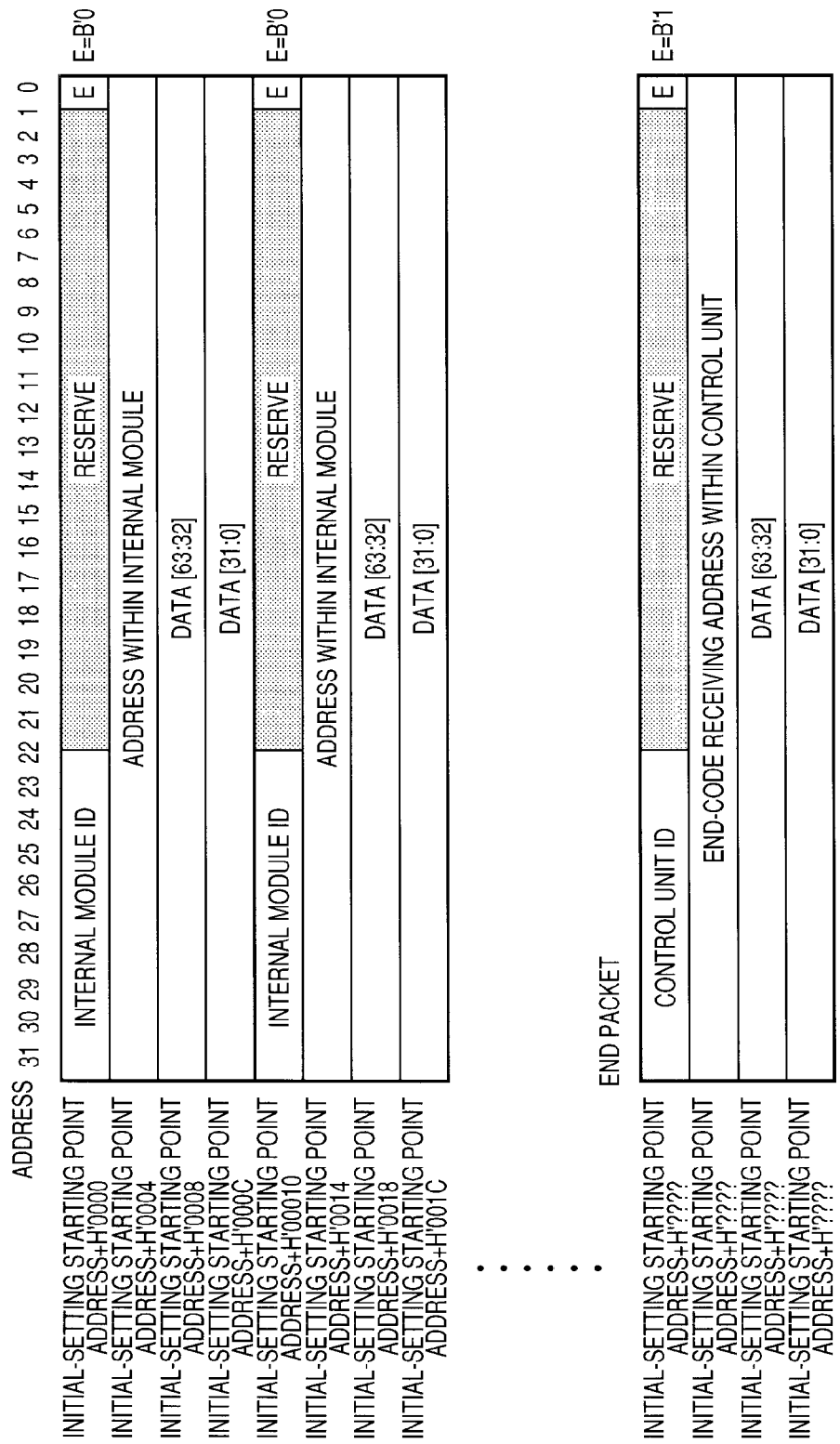
FIG. 3 is a data format chart illustrating a packet structure of initial setting value data used for initial setting.

FIG. 2 is a flowchart of activation processing (initial setting and activation of the image processing module after the initial setting) in the image encoding or decoding processing using the image encoding/decoding device 101. First, in Step S201, the CPU 106 sets initial value data necessary for reading initial setting values such as an initial-setting-value starting point address for identifying a location of the data, the program, or the like necessary for the initial setting, and an initial setting value of the endian mode, to the control unit 103, and, after the setting, the signal processing unit 102 is activated to perform read operation of the initial setting value data for the image processing module 104 according to the set initial value data. Thereby, in Step S202, the signal processing unit 102 performs the read operation of the initial setting value data from the storage unit 107. For example, the initial setting value data is composed of a packet having an internal module ID (image processing module ID), a flag E, and an address and data within the internal module, as shown in FIG. 3. If the flag E exhibits "0", it means that the data is the initial setting value data and there is a following packet. If the flag E exhibits "1", it means the packet is an end packet and a data portion thereof stores an end code receiving address within the control unit and the like. The read operation of Step S202 is repeated until the end packet (E=1) is detected, and when the end packet is detected, the read operation of the initial setting value data in Step S204 is terminated. The read initial setting value data is transferred internally and initially set to the register and the storage unit of the image processing module 104, which is indicated by the module ID and the in-module addresses within the packet, by the control of the signal processing unit 102. In Step S205, the control unit 103 determines whether it is necessary further to read the initial setting value data from another storing address, and if it is necessary to continue the read, the control unit 103 enables the signal processing unit 102 to repeat the processing from Step S201 to Step S205. After all the sets of initial setting value data have been completed to be read, the control unit 103 instructs the image processing module 104 to start image processing in Step S206. Note that the endian mode indicates that transfer mode in the bus 108 is big endian or little endian.

Figure 4:
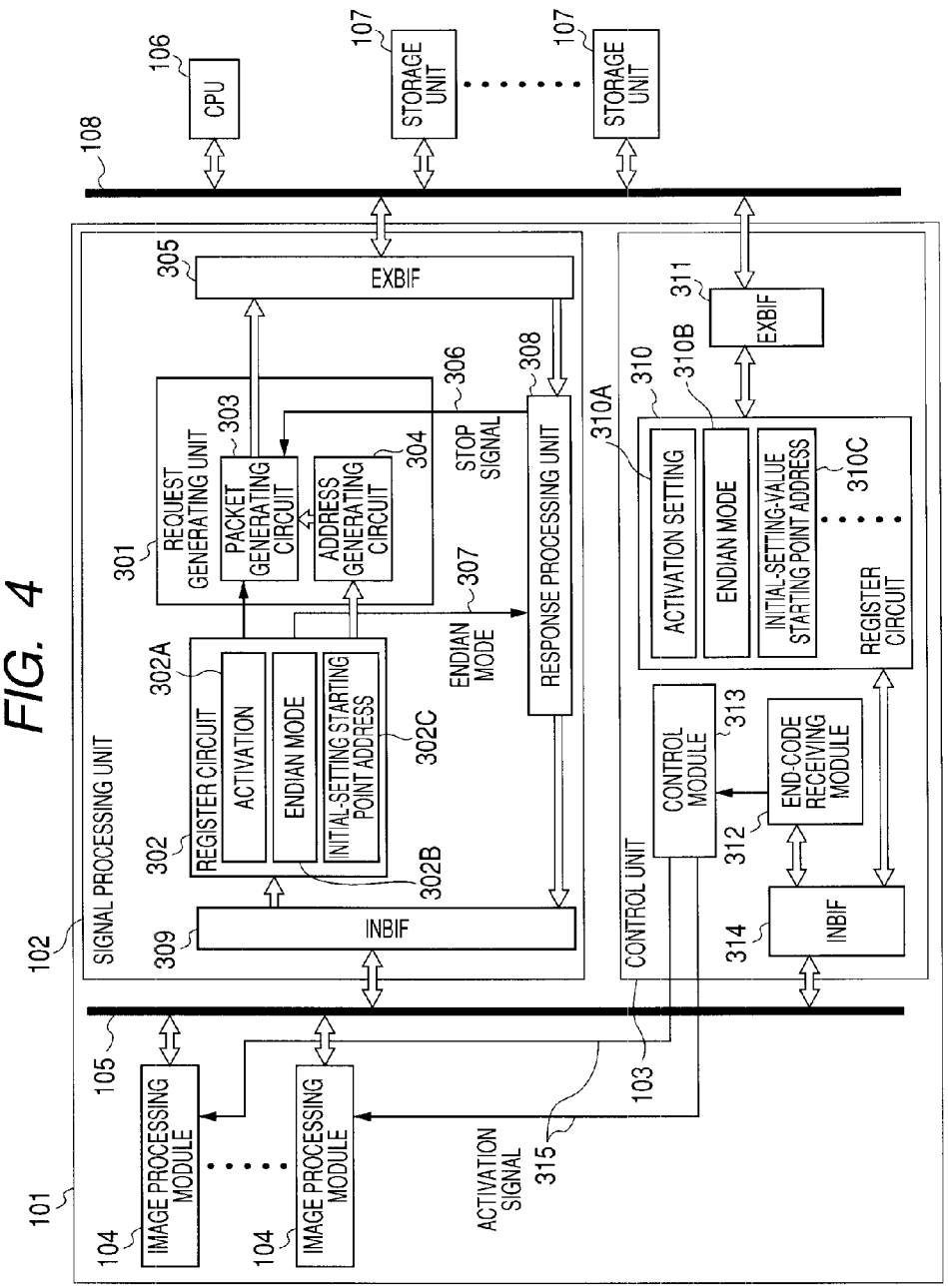
FIG. 4 is a block diagram showing a specific example of a signal processing unit together with details of a control unit.
Figure 5:
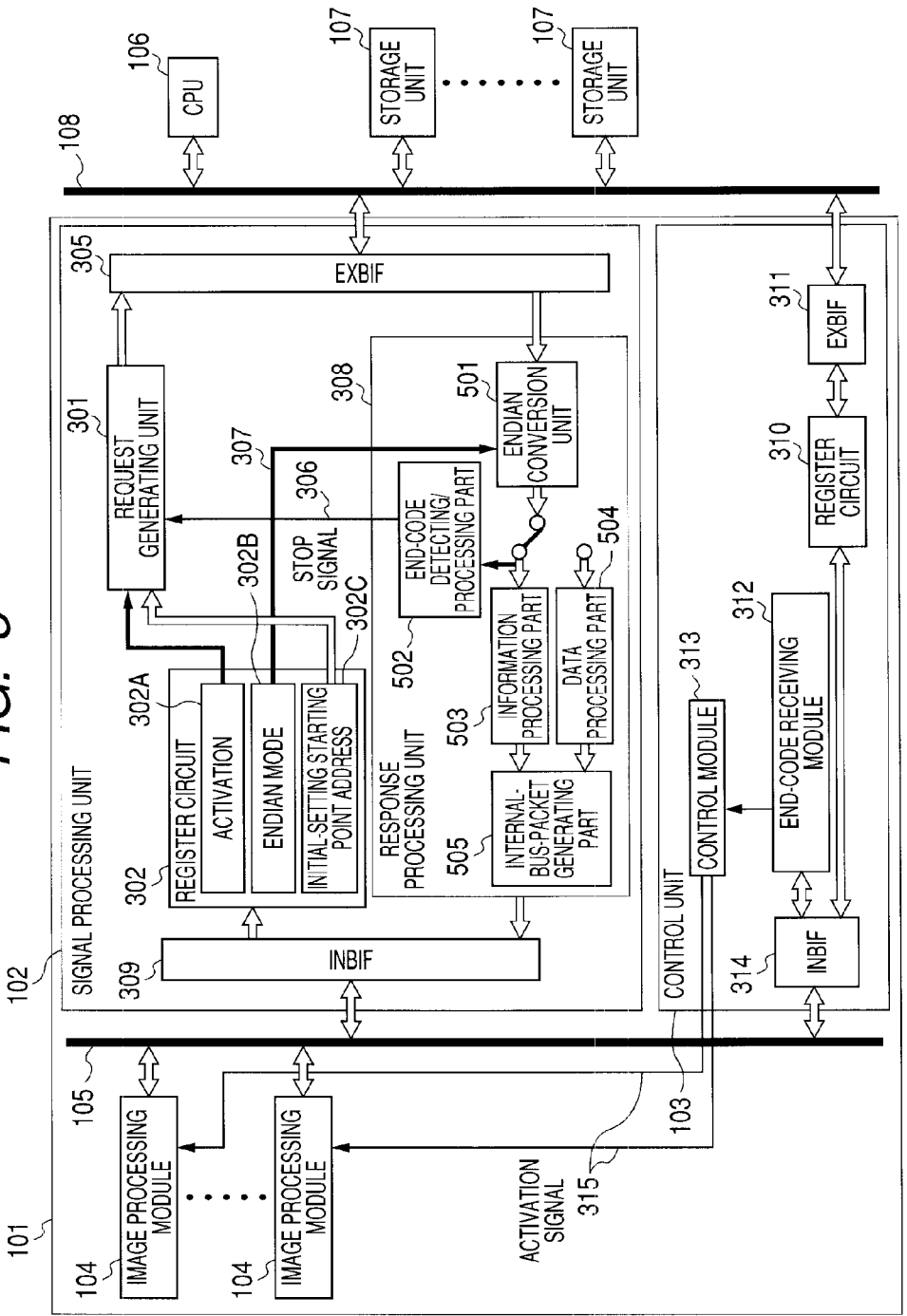
FIG. 5 is a block diagram showing a specific example of the control unit together with details of the signal processing unit.

FIG. 4 and FIG. 5 show specific examples of the signal processing unit 102 and the control unit 103. In particular, FIG. 4 shows details of the control unit 103 and FIG. 5 shows details of the signal processing unit 102.

In FIG. 4, the control unit 103 includes a register circuit 310, an external bus interface (EXBIF) 311, an end code receiving module 312, a control module 313, and an internal bus interface (INBIF) 314. The register circuit 310 includes respective registers 310A, 310B, 310C, . . . , for the activation setting, the endian mode, and the plurality of initial-setting-value starting point addresses.

In FIG. 4, the signal processing unit 102 includes a request generating unit 301, a register circuit 302, a response processing unit 308, an external bus interface (EXBIF) 305, and an internal bus interface (INBIF) 309. The register circuit 302 includes respective registers 302A, 302B, and 302C for the activation, the endian mode, and the initial-setting-value starting point addresses. The request generating unit 301 includes an address generating circuit 304 and a packet generating circuit 303.

The read function for the initial setting value data will be described with reference to FIG. 4. The signal processing unit 102 to perform the initial setting value read is activated by the control unit 103 to start the operation. For the initial setting value read, first, data is set to the register circuit 310 in the control unit 103 from the CPU 106 via the external bus 108 and the external bus interface 311. The data set to the register circuit 310 from the CPU 106 includes the initial-setting-value starting point address on the storage unit 107 which stores the initial setting value data, the endian mode of the external bus 108, and the activation setting. The activation setting is set after the setting of the initial-setting-value starting point address, the endian mode, etc. are completed. This activation setting activates the initial setting value read operation of the control unit 103. Subsequently, after the completion of the initial setting value read operation, the control module 313 activates the image processing module 104. Alternatively, it is possible to select an activation unit for the activation, as in a case to activate only the image processing module 104 in a state where the initial setting value read has been already completed.

When instructed to activate the initial setting value read operation by the activation setting, the control unit 103 transfers the setting data to the register circuit 302 in the signal processing unit 102, which performs the initial setting value data read operation, via the internal bus 105 within the control unit 103. The setting data to be transferred includes the endian mode and one of the initial-setting-value starting point address which are set to the register circuit 310 by the CPU 106. After the transfer of the register data necessary for the initial setting value read of the initial-setting-value starting point address, the endian mode, etc., to the register circuit 302 in the signal processing unit 102, the control unit 103 activates the signal processing unit 102 to start the initial setting value read operation by setting enable data to the activation register. When instructed to activate the initial setting value read operation, the request generating unit 301 reads out the initial-setting-value starting point address from the register, and performs calculation of an address on the external bus 108 corresponding to the initial-setting-value starting point address in the address generating circuit 304. The packet generating circuit 303 generates a bus command. The address generated by the address generating circuit 304, the bus command generated by the packet generating circuit 303, etc. are converted by the external bus interface circuit 305 into an external bus protocol and output to the external bus 108. According to this bus command, the initial setting value data is read out from the storage unit 107, and the read-out initial setting value data is supplied to the response processing unit 308 from the external bus interface circuit 305 as a response. The request generating circuit 301 continues to generate the request packet until a stop signal 306 is input from the response processing unit 308, and stops to generate the request and waits for the next activation when the stop signal 306 is input. The generation stop of the request corresponds to Step S204 in FIG. 2. The generation stop of the request is detected by the end code indicating E=1 in FIG. 3.

Here, an example of the initial setting value data stored in the external storage unit 107 will be described in more detail according to FIG. 3. For the initial setting value data stored in the external storage unit 107, it is optional to select the number of bits for composing one packet according to a data amount to be dealt, a kind of the data, the number of the internal modules (the number of ID bits of the internal modules), the number of address bits of the internal modules, etc. Here, there will be described a case in which data of 128 bits is dealt as one packet. First 32 bits store the ID of the internal module (image processing module 104) and the bit E for indicating the end packet. The next 32 bits are used for a bit sequence storing the address within the internal module. The next 64 bits are used for bit sequence storing data to be transferred to the internal module. These 128 bits are dealt as one packet. The bit E for indicating the end packet is enabled (E=1) for the end packet. The internal module ID stores the ID of the control unit 103, and the address within the internal module stores a dedicated address receiving the end code within the control unit 103 (within the end code receiving module 312). The data from the first packet to the end packet of the initial setting value data is stored in an area continued from the initial-setting value starting point address.

Next, there will be described an internal transfer function of the initial setting value data by the response processing unit with reference to FIG. 5. The response to the request output to the external bus 108 from the request generating unit 301 is input into the response processing unit 308 via the external bus interface 305. In the response processing unit 308, an endian conversion unit 501 first provides the input response with an endian conversion by the endian mode set in the register 302B. Then, the endian conversion unit 501 determines whether the response data is a information portion (portion of the internal module ID, the bit E indicating the end packet, and the address within the internal module in the setting data example of FIG. 3), or a data portion (data portion in the setting data example of FIG. 3), and sends the data to an information processing part 503 if the response data is the information portion and sends the data to a data processing part 504 if the response data is the data portion. The information processing part 503 analyzes the internal module ID and the address within the internal module, generates an address signal of the internal bus 105, a module ID signal, etc., and sends each of the signals to an internal bus packet generating part 505. The data processing part 504 generates an internal bus data signal and sends the signal to the internal bus packet generating part 505. Further, an end code detection/processing part 502 monitors the end packet code E in the information portion, and outputs the request stop signal 306 to the request generating unit 301 and stops the request generation when having detected the end code (E=1). The internal bus packet generating part 505 generates an internal bus packet from the signals input from the information processing part 503 and the data processing part 504 and sends out the packet to the internal bus 105 via the internal bus interface 309. The image processing module 104 stores the initial setting value data into the internal register and storage unit according to the address within the internal module, when having received the packet addressed to the image processing module 104. The end packet is transferred to the end code receiving module 312 in the control unit 103. The end code receiving module 312 receives the end packet via the internal bus interface 314 and determines that the initial setting value is set to the required image processing module 104 by a series of the packet transfer. When having received the end packet, the end code receiving module 312 transmits an activation signal 315 to the image processing module 104 and enables the image processing module 104 to start the image processing. As shown in Step S205 of FIG. 2, when it is necessary to continue the initial setting value data read, the image processing is activated after all the initial setting value data reads have been completed. Whether the initial setting value data read needs to be continued or not can be determined by the judgment whether the initial setting operation has been completed or not for all the initial-setting-value starting point addresses set by the CPU 106 to the register 310C. For example, it may be determined by the judgment whether the number of writings to the register 310C by the CPU 106 is the same as the number of readings from the register 310C by the control unit 103.

By separating the register 310A for activating the initial setting value data read in the control unit and the register for activating the image processing (within the end code receiving module 312), it is also possible to activate the start of the initial setting value data read and the start of the image processing separately. Further, by updating the initial-setting value starting point address and activating the initial data read again, it is also possible to store the initial setting value data in a plurality of locations in the external storage unit.

Figure 7:
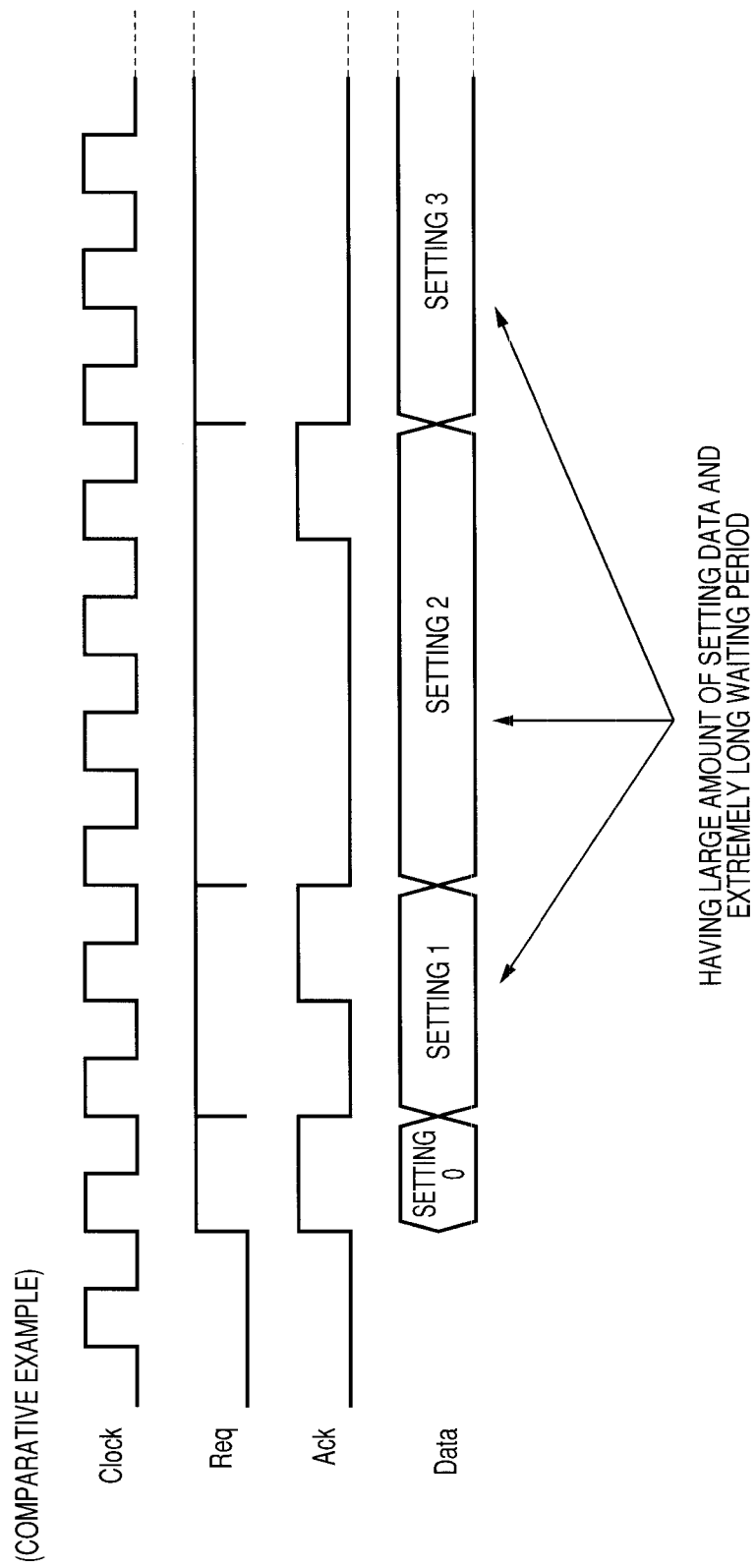
FIG. 7 is a timing chart showing a comparative example of data transfer operation when a CPU directly performs setting for all registers.
Figure 8:
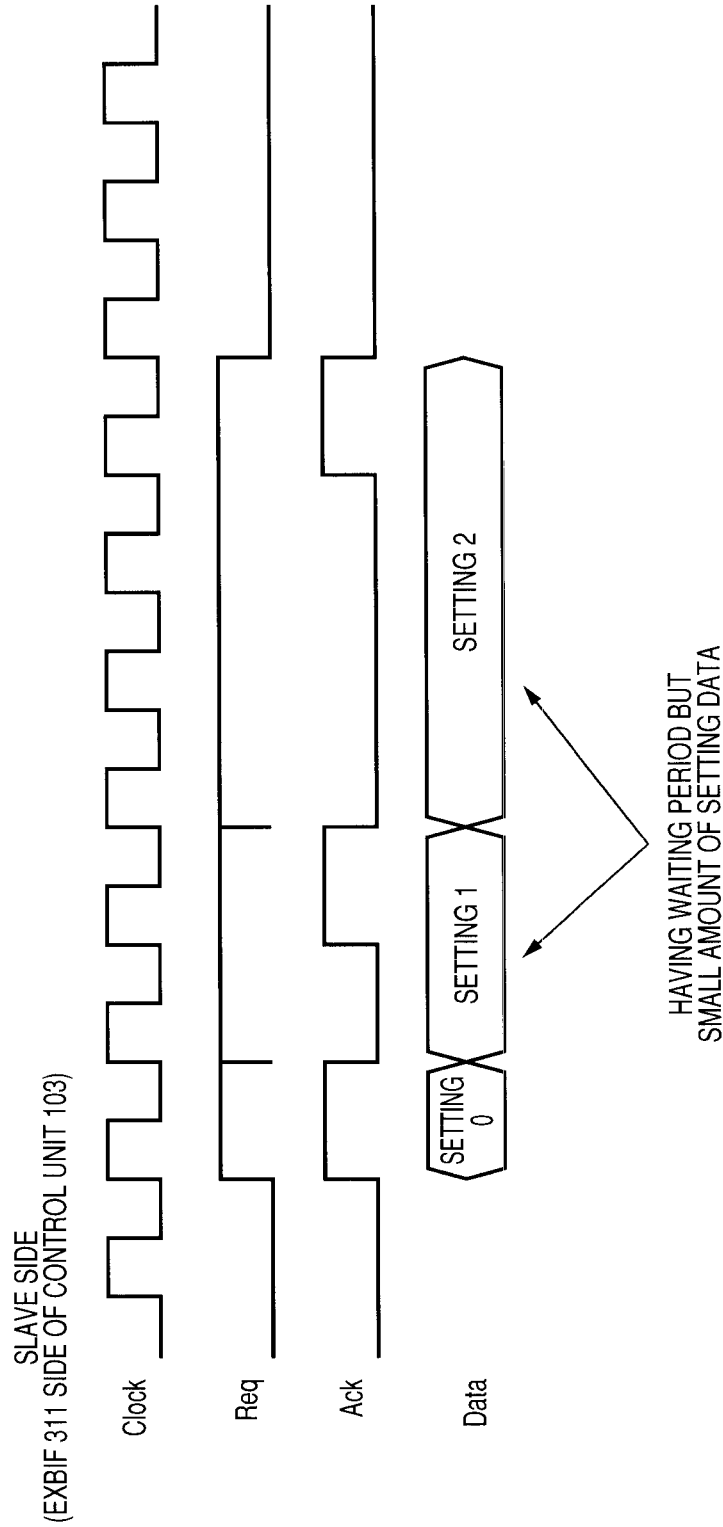
FIG. 8 is a timing chart showing operation when a CPU sets an internal register via a slave port of the control unit, for comparison with FIG. 7.

By use of the signal processing unit 102 and the control unit 103 described above, only the minimum setting is performed to the control unit 103 from the CPU 106, such as the initial-setting value starting point address, the endian mode, etc., and thereby the signal processing unit 102 can read out the initial setting value data automatically from the external storage unit 107 according to the minimum setting and can perform the initial setting of data, a program, etc. to the internal image processing module 104 for starting the image processing. Accordingly, it is not necessary to perform a large amount of register setting compared to a case in which the CPU sets all the sets of initial setting value data and performs the initial setting. Therefore, it is possible to reduce the CPU load considerably. For example, when the CPU performs all the register settings directly, the CPU needs to wait until acknowledgment is returned in response to a bus access request (low level period of Ack), according to the state of the setting target side or the state of the bus as shown in FIG. 7, and not only the operating time but also the waiting time of the CPU becomes long to increase the CPU load considerably, when the setting data amount is large. On the other hand, when the CPU 106 is allowed to set only the register circuit 310A as in the present embodiment, though the waiting time until the return of the acknowledge (low level period of Ack) exists as shown in FIG. 8, the setting data amount is considerably small and the load of the CPU 106 is reduced substantially compared to the case of FIG. 7.

Since only the initial setting value data can be activated, it is possible to transfer the initial setting value data in a period when the bus load is light, and it is possible to reduce the bus load.

Figure 9:
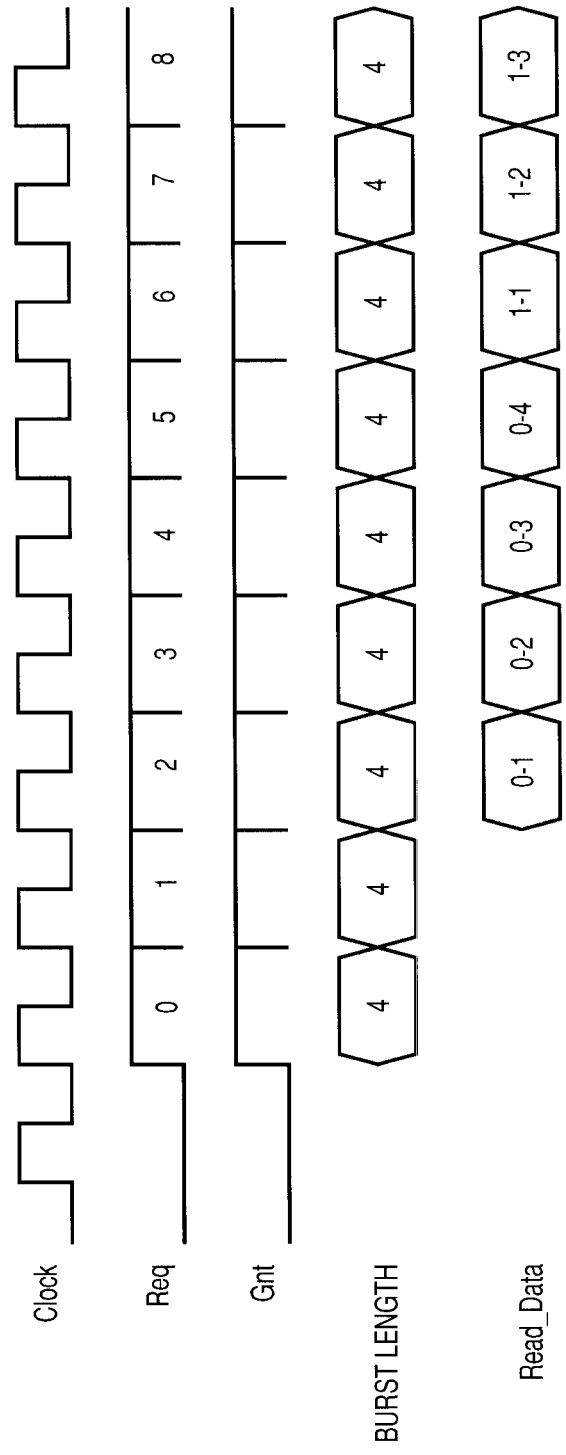
FIG. 9 is a timing chart illustrating operation of reading initial setting value data by use of a master port of the signal processing unit.

Further, the external bus interface circuit 311 side of the control unit 103 functions as a slave port, but the external bus interface 305 side of the signal processing unit 102 functions as a master port. Accordingly, since the initial setting is performed by using this master port, it is possible to realize speed up compared to the case in which the register is set from the slave port, depending on the external bus specification. For example, it is possible to read-in data continuously utilizing burst transfer or the like, as shown in FIG. 9.

Figure 6:
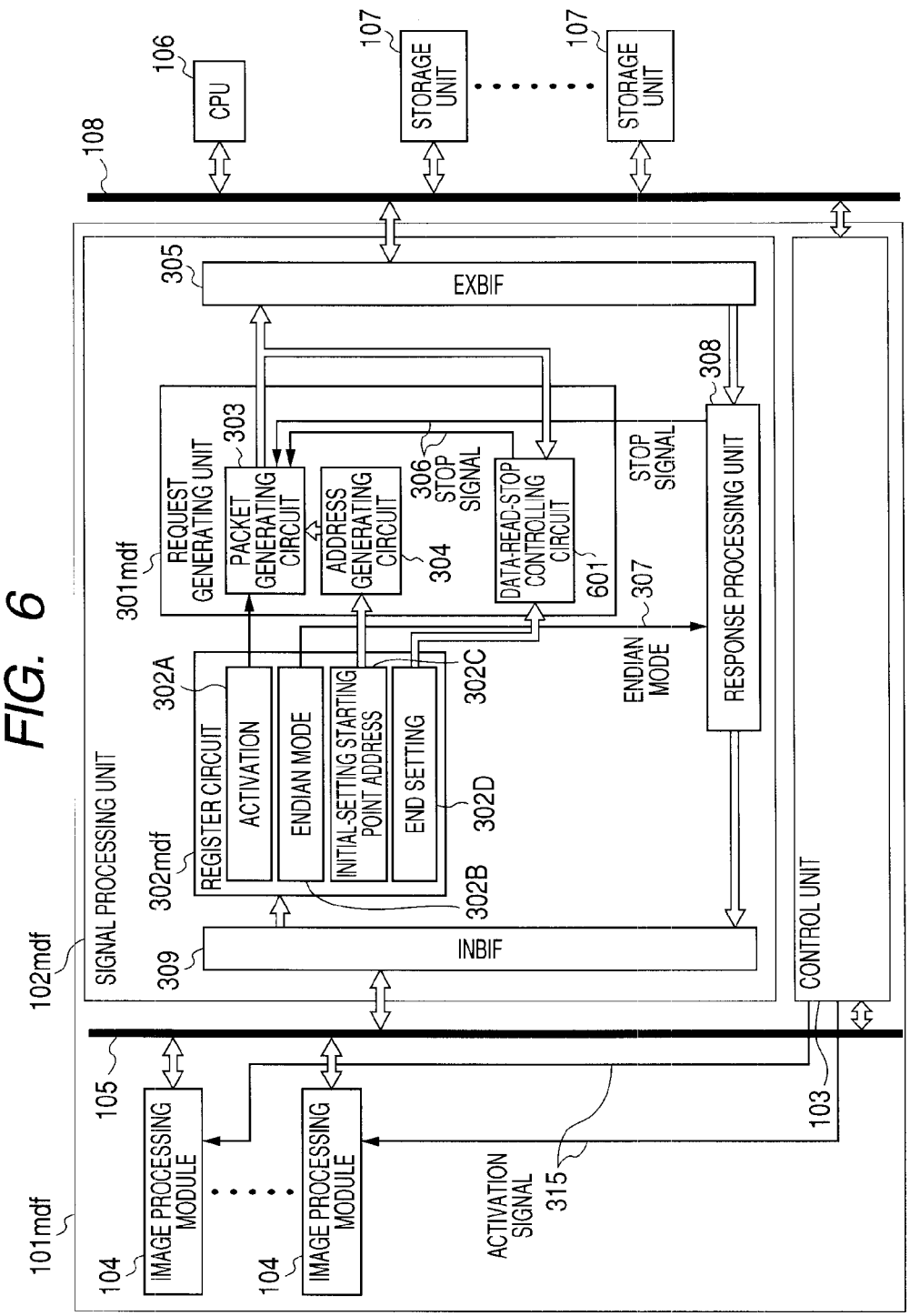
FIG. 6 is a block diagram illustrating another image encoding/decoding device according to the present invention.

FIG. 6 illustrates another image encoding/decoding device 101mdf according to the present invention. This is different from the image encoding/decoding device 101 of FIGS. 4 and 5 in a stop control mode of the data read in a signal processing unit 102mdf. For example, the signal processing unit 102mdf does not detect the end code, a request generating unit 301mdf is provided with a data read stop control circuit 601, and a stop setting register 302D is added to a register circuit 302mdf. An instructed value from the CPU 106 is set to the stop setting register 302D by the control unit 103. To the stop setting register 302D are set conditions to stop the request issue, such as the number of request issues, the read data amount, a read end address of the external storage unit, for example. The request generating unit 301mdf receives the stop setting from the register 302D and instructs the packet generating circuit 303 to stop the request issue when the stop condition is satisfied.

The image encoding/decoding device 101 in FIGS. 4 and 5 confirms the response from the external bus 108 and performs the request stop processing when having detected the end packet. Accordingly, the requests, which have been issued until the read of the end packet, become to be useless readings. In the example in FIG. 6, the stop conditions are preliminarily set and the useless reading can be eliminated.

Figure 10:
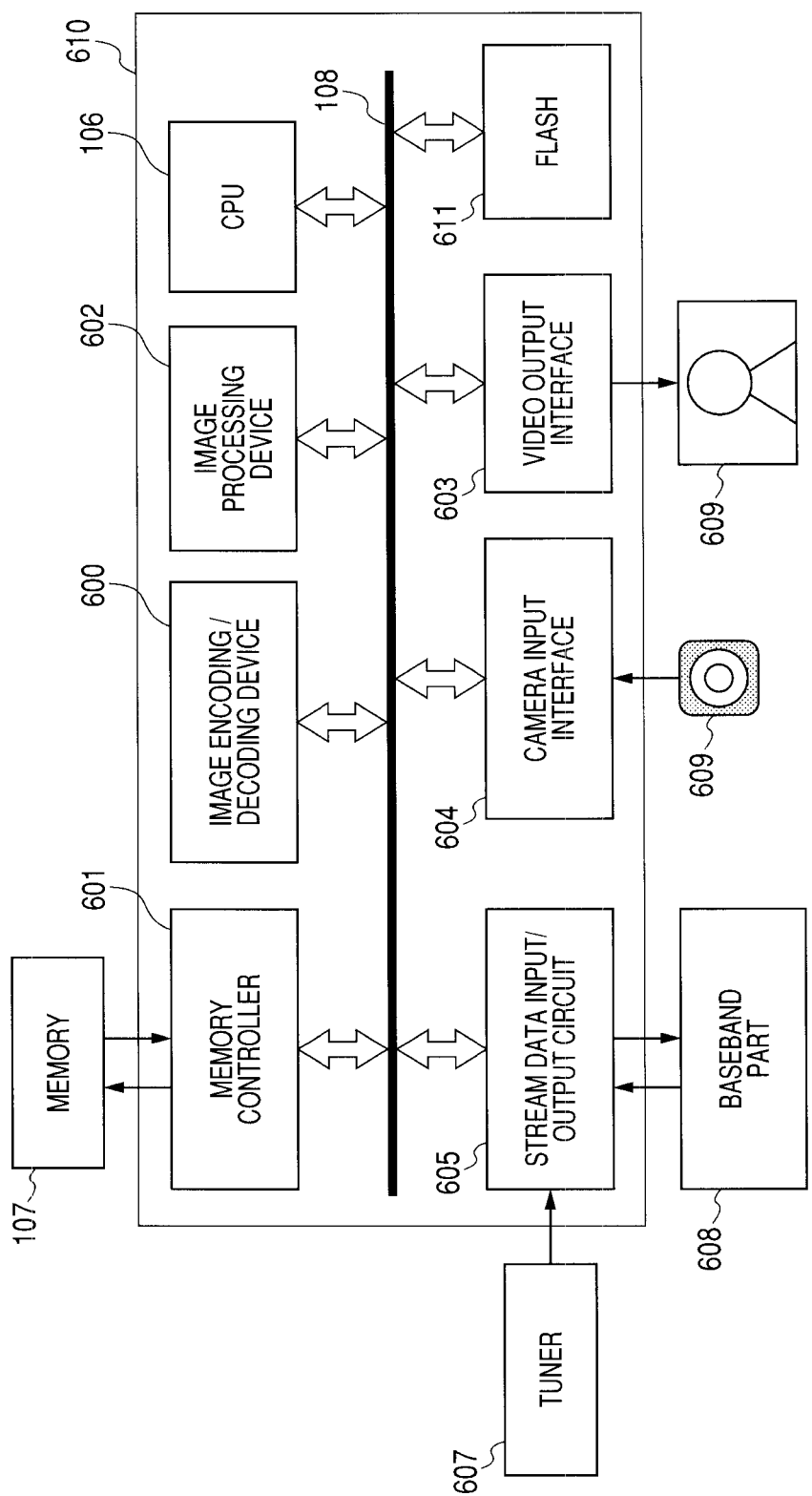
FIG. 10 is a block diagram showing an example of a mobile phone system, to which the image encoding/decoding device is applied.

FIG. 10 shows an example of the image encoding/decoding device applied to a mobile phone system. A baseband part 608 is coupled with a high-frequency part via an analog front end, which is omitted from the drawing, and is enabled to perform transmission/reception of the mobile phone. Symbol 610 indicates an application processor. The application processor 610 includes an image encoding/decoding device 600 according to the present invention, a flash memory 611 as a re-writable non-volatile memory, a CPU 106, a memory controller 601, an image processing unit 602, a video output interface 603, a camera input interface 604, and a stream data input/output circuit 605, which are coupled in common to a bus 108. The stream data input/output circuit 605 is coupled with the baseband part 608 and a tuner 607, and enabled to input stream data downloaded from a mobile phone network or stream data received by the tuner 607. The image encoding/decoding device 600 is provided with the circuit configuration explained in FIGS. 4 and 5 or FIG. 6. The flash memory 611, while not limited in particular, initially stores a program and data initially to be set in the image processing module 104 of the image encoding/decoding device 600, together with an operation program of the CPU 106. These program and data for the initial setting are transferred to a predetermined area of the memory 107 by power-on/reset processing of the application processor 610, or downloaded as needed via the network and stored into the predetermined area of the memory 107. The program and data for the initial setting preliminarily stored in the memory in this manner are those for realizing an encoding/decoding algorithm of MPRG2, MPEG4, or H.264, for example. The CPU 106, according to the operation program, sets control information (initial-setting-value starting point address and endian mode), which is necessary for selecting one from among the encoding/decoding algorithms of MPRG2, MPEG4, and H.264, to the register circuit 310 of the image encoding/decoding device. Thereby, the image encoding/decoding device 101 can selectively perform the encoding/decoding processing compliant to MPRG2, MPEG4, or H.264.

FIG. 11 illustrates a basic functional-block-diagram of an encoding element 620 and decoding element 630 for a video image in the image encoding/decoding device 600. For an input image, the encoding element 620 is provided with each function of motion compensation, DCT, quantization, variable length encoding, inverse quantization, and inverse DCT. For the encoded data, the decoding element 630 is provided with each function of variable length decoding, inverse quantization, inverse DCT, and motion compensation. The encoding element 620 and the decoding element 630 are realized by the multiple image processing modules 104.

FIG. 12 shows an example of the image processing module suitable for a case in which the functions of the encoding element 620 and the decoding element 630 of FIG. 11 are performed by a pipeline method. In FIG. 12, the image processing module employs a multi-processor system which is provided with multiple processor units 700 to 709. RAMs 800 to 803 are coupled to the processor units 700 to 703 and RAMs 805 to 808 are coupled to the processor units 705 to 708, respectively. The processor unit 700 is assigned to the motion compensation, the processor unit 701 is assigned to the DCT and the inverse DCT, the processor unit 702 is assigned to the quantization and the inverse quantization, the processor unit 703 is assigned to the variable length encoding and decoding, and the processor unit 704 performs a control function for the processor units 700 to 703. The RAMs 800 to 803 are utilized for retaining programs and data to realize the functions of the respective corresponding processor units. This is the same for another set of the processor units 705 to 709 and the RAMs 805 to 808.

In the image processing module configuration in FIG. 12, parallel processing is performed by the multiple processor units 700 to 703 and 705 to 708, and therefore, the initial setting data amount is increased by the number of processes in the parallel processing, for the initial setting of the registers in the processor units and for the initial setting of the program and data to the RAM. Accordingly, in the case employing the image processing module which performs the encoding/decoding processing having a large number of parallel processes, the employment of the configuration of FIGS. 4 and 5 or FIG. 6 makes the effects, such as the reduction of the CPU load and the increase of the operation speed in the initial setting, to become furthermore evident.

In the image encoding/decoding device described hereinabove, when the CPU 106 sets the head storing address information of the storage unit 107, which stores the information indicating the setting value and the setting-target location, to the control unit 103 for the activation, the signal processing unit 102 reads out the information, which indicates the setting value and the setting-target location, automatically from the set address position, and the multiple image processing modules 104 are provided with the initial setting according to the information indicating the setting-target location. That is, the CPU 106 stores the initial setting value data in the external storage unit 107 and sets the address information, which indicates the head position of the storing location, to the control unit 103 for the activation, and then the signal processing unit 102 reads out the initial setting value data automatically to perform the initial setting to the image processing module 104.

By embedding information identifying the image processing module into the initial setting information retained in the storage unit 107, the CPU does not need to set the address of the image processing module to the control unit 103.

By locating the data packet indicating the end of the initial setting value data at the last of the initial setting value data, it is possible automatically to stop the signal processing unit from issuing the read request to the external storage unit 107. When the stop condition is set to the signal processing unit, it is possible to control the stop of the read request without analyzing the packet flag (E) of the response data read out from the external storage unit.

Since the signal processing unit 102 can perform the continuous access using the burst access or the like to read a plurality of sets of data by a single command, it is possible to perform the processing at high speed compared to the slave access used in the conventional initial setting.

While the invention achieved by the present inventors has been described specifically according to the embodiments, the present invention is not limited thereto and it is obvious to be able to make various modifications within the scope not departing from the spirit of the invention. The present invention can be applied widely not only to the image encoding/decoding device but also to the data processing device having the multiple processor units operated in parallel. In the latter case, the processor units are the initial setting targets instead of the image processing modules.

What is claimed is:

1. A data processing device, comprising:
   a plurality of processor units performing data processing in parallel according to an initially set program and data;
   a first circuit, to which control information is set from outside for initial setting; and
   a second circuit reading-in initial setting information and setting-target information of the initial setting information from outside using the control information set in the first circuit, and transferring the initial setting information to the processor unit according to the read-in setting-target information,
   wherein the control information includes address information indicating storage locations of the initial setting information and the setting-target information.

2. The data processing device according to claim 1, wherein
   the control information includes address information indicating heads of the storage locations of the initial setting information and the setting-target information, and the second circuit sequentially increments the address information indicating the heads and sequentially generates read-in targets of the initial setting information and the setting-target information.

3. The data processing device according to claim 2, wherein
   the setting-target information includes information indicating a storage area.

4. The data processing device according to claim 2, wherein
   the initial setting information and the setting-target information constitute a fixed-length packet for each set of the setting-target information, each packet including a flag, and a first state of the flag indicating that the flag is followed by the initial setting information and a second state of the flag indicating that the packet is an end packet.

5. The data processing device according to claim 4, wherein
   the second circuit completes the read-in of the initial setting information and the setting-target information, and completes transfer processing of the initial setting information according to the read-in information, in response to the flag of the end packet.

6. The data processing device according to claim 4, wherein
   the second circuit transfers code information to the first circuit according to the address information following the flag of the end packet, and the first circuit instructs the processor units to start encoding and decoding processing in response to the transferred code information.

7. A data processing device, comprising:
   a plurality of processor units performing data processing in parallel according to an initially set program and data;
   a first circuit, to which control information is set from outside for initial setting;
   a second circuit reading-in initial setting information and setting-target information of the initial setting information from outside using the control information set in the first circuit, and transferring the initial setting information to the processor unit according to the read-in setting-target information,
   wherein the plurality of processor units include processor units to perform arithmetic processing for encoding and decoding.

8. The data processing device according to claim 7, wherein
   a RAM, which is utilized for storing an operation program of the processor unit and data, is provided to each processor unit and the initial setting information is initially set to the RAM.

* * * * *